United States Patent
Banerjea et al.

(10) Patent No.: US 9,485,728 B1
(45) Date of Patent: Nov. 1, 2016

(54) POWER SAVING WITH WNM-SLEEP MODE

(71) Applicant: MARVELL INTERNATIONAL LTD., Hamilton (BM)

(72) Inventors: Raja Banerjea, Sunnyvale, CA (US); Sagar D. Bijwe, Pune (IN)

(73) Assignee: Marvell International Ltd., Hamilton (BM)

( * ) Notice: Subject to any disclaimer, the term of this patent is extended or adjusted under 35 U.S.C. 154(b) by 292 days.

(21) Appl. No.: 13/894,915

(22) Filed: May 15, 2013

Related U.S. Application Data

(60) Provisional application No. 61/647,135, filed on May 15, 2012.

(51) Int. Cl.
    *H04W 52/02* (2009.01)
(52) U.S. Cl.
    CPC .................. *H04W 52/0212* (2013.01)
(58) Field of Classification Search
    CPC ............... H04W 52/0203; H04W 52/0206; H04W 84/12; H04W 52/0225; H04W 88/08; H04W 52/0216; H04W 28/14; H04W 52/0209; H04W 52/0274; H04W 84/02; H04W 52/00; H04W 92/10; H04W 28/18; H04W 28/16; Y02B 60/50; H04L 12/189; H04L 47/14
    See application file for complete search history.

(56) References Cited

U.S. PATENT DOCUMENTS

| 7,881,322 B1* | 2/2011 | Benveniste | 370/414 |
| 7,978,637 B2* | 7/2011 | Benveniste | 370/311 |
| 2004/0141502 A1* | 7/2004 | Corson | H04W 84/12 370/389 |
| 2004/0184475 A1* | 9/2004 | Meier | 370/449 |
| 2004/0264396 A1* | 12/2004 | Ginzburg et al. | 370/311 |
| 2005/0025129 A1* | 2/2005 | Meier | H04L 29/12009 370/352 |
| 2005/0047356 A1* | 3/2005 | Fujii et al. | 370/311 |
| 2006/0007935 A1* | 1/2006 | Bennett et al. | 370/395.5 |
| 2006/0025181 A1* | 2/2006 | Kalofonos | H04W 76/046 455/574 |

(Continued)

OTHER PUBLICATIONS

Kim et al. "A New Power-Saving mechanism for WLAN Broadcast/Multicast services", May 7-10, 2006, Vehicular Technology Conference, 2006 VTC 2006-Spring IEEE 63rd, vol. 1, pp. 7-11.*

(Continued)

*Primary Examiner* — Pao Sinkantarakorn
*Assistant Examiner* — Michael Phillips

(57) ABSTRACT

A method in a communication device includes receiving from a station a request to enter a power save mode, and in response to receiving the request, enabling a set of services. The set of services includes buffering of data intended for the station. The method also includes, after enabling the set of services, receiving from the station an indicator that the station is awake, and in response to receiving the indicator, disabling the set of services. The method also includes, after disabling the set of services, receiving from the station an indicator that the station is no longer awake, in response to receiving the indicator, again enabling the set of services. The method also includes, after again enabling the set of services, receiving from the station a request to exit the power save mode, and in response to receiving the request, again disabling the set of services.

20 Claims, 8 Drawing Sheets

(56) References Cited

U.S. PATENT DOCUMENTS

| | | | |
|---|---|---|---|
| 2006/0126533 A1* | 6/2006 | Wang | H04W 8/26 370/254 |
| 2006/0252443 A1* | 11/2006 | Sammour et al. | 455/518 |
| 2007/0238438 A1* | 10/2007 | Alon et al. | 455/343.2 |
| 2007/0253399 A1* | 11/2007 | Deshpande | H04L 12/12 370/347 |
| 2008/0069021 A1* | 3/2008 | Chhabra | 370/311 |
| 2008/0123577 A1* | 5/2008 | Jaakkola | H04W 52/0225 370/311 |
| 2009/0232042 A1* | 9/2009 | Kneckt et al. | 370/312 |
| 2009/0238157 A1* | 9/2009 | Poyhonen | H04W 48/16 370/338 |
| 2010/0110948 A1* | 5/2010 | Batta | 370/311 |
| 2010/0157835 A1* | 6/2010 | Zhang et al. | 370/252 |
| 2010/0265864 A1* | 10/2010 | He et al. | 370/311 |
| 2012/0188925 A1* | 7/2012 | Lee et al. | 370/311 |
| 2013/0201866 A1* | 8/2013 | Wentink et al. | 370/253 |
| 2013/0235773 A1* | 9/2013 | Wang et al. | 370/311 |
| 2013/0303202 A1* | 11/2013 | Jafarian | H04W 68/00 455/458 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11 ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.
"IEEE P802.11 nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
IEEE Std 802.11vTM/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, (Aug. 2010) (Part 1).
IEEE Std 802.11vTM/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, (Aug. 2010) (Part 2).
IEEE Std 802.11vTM/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management the Institute of Electrical and Electronics Engineers, Inc., (Aug. 2010) (Part 3).
IEEE Std 802.11vTM/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, (Aug. 2010) (Part 4).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, (1999).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," *The Institute of Electrical and Electronics Engineers, Inc.*, 1999.
IEEE Std 802.11™ 2012 (Revision of IEEE Std 802.11.2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," The Institute of Electrical and Electronics Engineers, Inc., pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

Chen, "Home Network Basis: Transmission Environments and Wired/Wireless Protocols," Prentice Hall, pp. 1-26, 2006.

Hiertz et al., "The IEEE 802.11 Universe," IEEE Communications Magazine, pp. 62-70, (Jan. 2010).

Park et al., "Low Power Capability Support for 802.11ah," doc. No. IEEE 802.11-11/0060r1, The Institute for Electrical and Electronics Engineers, 7 pages (Jan. 17, 2011).

Park, "Specification Framework for TGah," The Institute of Electrical and Electronics Engineers, doc. No. IEEE 802.11-11/1137r13, pp. 1-58 (Jan. 14, 2013).

Park, "Proposed Specification Framework for TGah", The Institute of Electrical and Electronics Engineers, doc. No. IEEE 802.11-11/1137r6, pp. 1-13 (Mar. 2012).

\* cited by examiner

POWER SAVING WITH WNM-SLEEP MODE

CROSS-REFERENCE TO RELATED APPLICATION

This claims the benefit of U.S. Provisional Patent Application No. 61/647,135, entitled "Improved Power Saving with WNM-Sleep Mode" and filed on May 15, 2012, the disclosure of which is hereby incorporated by reference herein.

FIELD OF TECHNOLOGY

The present disclosure relates generally to wireless networks and, more particularly, to methods and systems for power management in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, many wireless local area networks (WLANs) operate according to Institute for Electrical and Electronics Engineers (IEEE) 802.11 standards, such as the 802.11a, 802.11b, 802.11g, or 802.11n Standard. When operating in an infrastructure mode, WLANs typically include an access point (AP) in communication with one or more stations. The stations in a WLAN typically include wireless transceivers, and may be associated with devices such as smart phones or laptops. Typically, the AP is also connected to a network, such as a corporate infrastructure network or the Internet. If an AP is connected to the Internet, the data transmitted between the AP and station may be Internet Protocol (IP) data used to support a variety of applications, from Voice over Internet Protocol (VoIP) communications to web browsing.

Power management techniques are generally used to lower the overall power consumption associated with wireless data communications, and are important for extending battery life for portable stations. As one example, IEEE 802.11 defines a power save mode in which a station in a sleep state wakes up to listen for data once every n beacon intervals, where n is an integer, and then sends a series of poll messages to receive available data frames from the AP. In addition, IEEE 802.11v has introduced a "wireless network management" sleep (WNM-sleep) mode that allows a station/device to remain in a sleep state for an even longer duration. While the currently-defined WNM-sleep mode may save additional power due to the relatively long sleep duration, the technique as currently defined may be poorly suited to certain types of traffic, such as the "bursty" traffic that often results when a user at a station browses web pages via the Internet. Further, while the current IEEE 802.11v Standard specifies that a station may use the WNM-sleep mode simultaneously with the power save mode of IEEE 802.11, no specific mechanism is provided to support interoperability between the WNM-sleep mode and the power save mode of IEEE 802.11.

SUMMARY

In an embodiment, a method in a communication device includes receiving from a station a request to enter a power save mode, and in response to receiving the request to enter the power save mode, enabling a set of services. The set of services includes buffering of data intended for the station. The method also includes, after enabling the set of services, receiving from the station an indicator that the station is awake, and in response to receiving the indicator that the station is awake, disabling the set of services. The method also includes, after disabling the set of services, receiving from the station an indicator that the station is no longer awake, and in response to receiving the indicator that the station is no longer awake, again enabling the set of services. The method also includes, after again enabling the set of services, receiving from the station a request to exit the power save mode, and in response to receiving the request to exit the power save mode, again disabling the set of services.

In another embodiment, a communication device includes a network interface configured to communicate with a station via a wireless communication channel, a memory configured to store data, and a network management module. The network management module is configured to, in response to the network interface receiving, from the station via the wireless communication channel, a request to enter a power save mode, enable a set of services. The set of services includes buffering, in the memory, of data intended for the station. The network management module is also configured to, in response to the network interface receiving, (i) from the station via the wireless communication channel and (ii) after enabling the set of services, an indicator that the station is awake, disable the set of services, and to, in response to the network interface receiving, (i) from the station via the wireless communication channel and (ii) after disabling the set of services, an indicator that the station is no longer awake, again enable the set of services. Subsequent to the network management module again enabling the set of services, in response to the network interface receiving, from the station via the wireless communication channel, a request to exit the power save mode, the network management module is configured to again disable the set of services.

In another embodiment, a method in a station includes sending to an access point a request to enter a power save mode. The request to enter the power save mode specifies a sleep interval. The method also includes receiving from the access point a response to the request. The response to the request includes an indicator confirming that a set of services is enabled, and the set of services includes buffering of data intended for the station. The method also includes causing the station to enter a sleep state. Causing the station to enter the sleep state includes decreasing power consumption at the station. The method also includes, after causing the station to enter the sleep state, determining that first data is available to be sent to the access point. The method also includes, in response to determining that the first data is available to be sent to the access point, causing the station to exit the sleep state and sending to the access point (i) an indicator that the station is awake and (ii) the first data. Causing the station to exit the sleep state includes increasing power consumption at the station. The method also includes, after causing the station to exit the sleep state, detecting an expiration of a timeout period during which no data is received from the access point. The method also includes, in response to detecting the expiration of the timeout period, sending to the access point an indicator that the station is no longer awake, and causing the station to again enter the sleep state. The method also includes, after causing the station to again enter the sleep state, detecting an expiration of the sleep interval. The method also includes, in response to detecting the expiration of the sleep interval, causing the station to again exit the sleep state.

In another embodiment, a communication device includes a network interface configured to communicate with an access point via a wireless communication channel, and a network management module configured to send, to the access point via the network interface, a request to enter a power save mode. The request to enter the power save mode specifies a sleep interval. The network management module is also configured to receive, from the access point via the network interface, a response to the request. The response to the request includes an indicator confirming that a set of services is enabled, and the set of services includes buffering of data intended for the communication device. The network management module is also configured to cause the communication device to enter a sleep state. Causing the communication device to enter the sleep state includes causing power consumption to decrease at the communication device. The network management module is also configured to, after causing the communication device to enter the sleep state, determine that first data is available to be sent to the access point. The network management module is also configured to, in response to determining that the first data is available to be sent to the access point, cause the communication device to exit the sleep state and send, to the access point via the network interface, (i) an indicator that the communication device is awake and (ii) the first data. Causing the communication device to exit the sleep state includes causing power consumption to increase at the communication device. The network management module is also configured to, after causing the communication device to exit the sleep state, detect an expiration of a timeout period during which no data is received from the access point. The network management module is also configured to, in response to detecting the expiration of the timeout period, send, to the access point via the network interface, an indicator that the communication device is no longer awake, and cause the communication device to again enter the sleep state. The network management module is also configured to, after causing the communication device to again enter the sleep state, detect an expiration of the sleep interval. The network management module is also configured to, in response to detecting the expiration of the sleep interval, cause the communication device to again exit the sleep state.

BRIEF DESCRIPTION OF THE DRAWINGS

Like reference symbols in the various drawings indicate like elements.

DETAILED DESCRIPTION

In embodiments described below, a station in a wireless local area network (WLAN) communicates with an access point (AP), e.g., according to an IEEE 802.11 infrastructure mode. In an embodiment, the station and AP utilize mechanisms allowing the station to enter an enhanced power save mode with a long sleep interval (e.g., long relative to the n beacon intervals of the IEEE 802.11 power save mode) in which the AP can provide the station with a set of services. In some embodiments, for example, the set of services provided by the AP includes services such as filtering of traffic intended for the station, and buffering of the data that satisfies the traffic filter parameters. In one embodiment, the enhanced power save mode is a modified Wireless Network Management sleep ("WNM-sleep") mode, and the set of services includes the buffering, filtering and other services specified by the IEEE 802.11v Standard for WNM-sleep mode.

In an embodiment, the station and AP utilize a mechanism whereby the station may, during the sleep interval, wake and go back to sleep without having to exit and reenter the enhanced power save mode. For example, the sleep state of the station may be temporarily interrupted when a user at the station enters a uniform resource locator (URL) of a web page, thereby allowing the URL to be sent to the AP, and allowing the contents of the corresponding web page to be downloaded, in one embodiment and scenario. While the sleep state of the station is interrupted in this manner, the AP disables some or all services within the set of services that it provides for the station. In an embodiment, the station reenters the sleep state after no traffic (e.g., from the AP) has been detected for a timeout period, at which point the AP again starts to provide the set of services for the station. In the web browsing scenario above, for example, the sleep state may be resumed shortly after the web page content has finished downloading.

In some embodiments, the station is capable of interrupting the sleep state of the station during the sleep interval without incurring a large amount of overhead (e.g., without requiring handshake signals to exit and reenter the power save mode). The extended duration of the sleep interval, combined with the ability to interrupt the sleep interval without extensive overhead signaling, makes the techniques disclosed in embodiments below particularly well suited to usage scenarios that involve bursty traffic, such as the common web browsing scenario described above.

Figure 1:
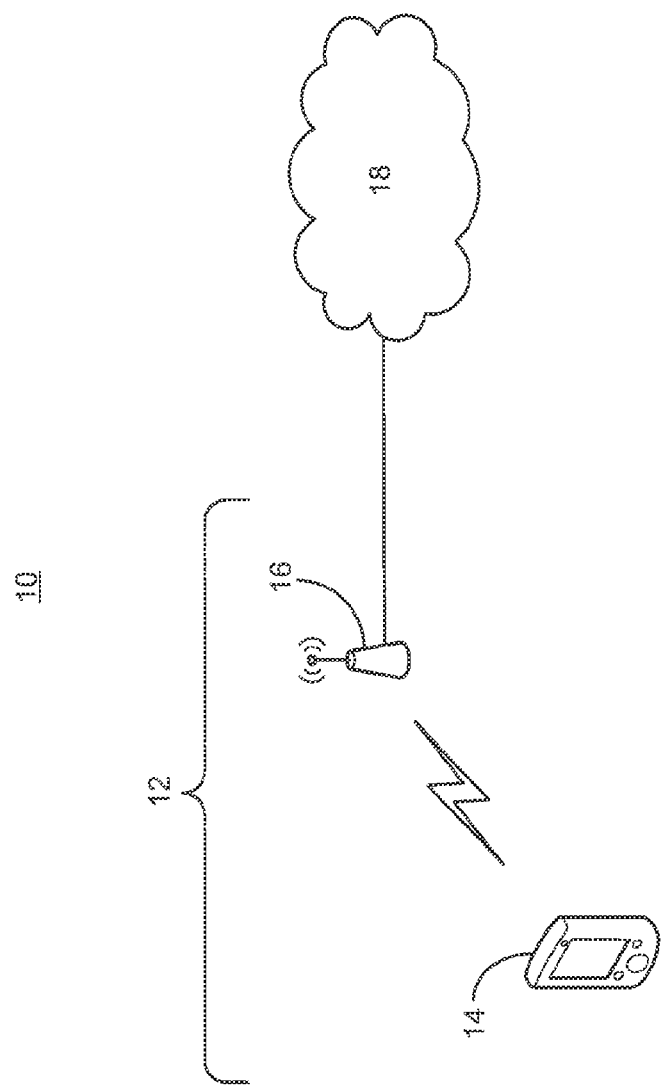
FIG. 1 is a diagram of an example system, including a wireless local area network (WLAN), in which power management techniques described herein are implemented, according to an embodiment.

FIG. 1 is a diagram of an example system 10, including a WLAN 12, in which power management techniques described herein are implemented, according to an embodiment. The WLAN 12 includes a mobile station 14 in communication with an AP 16. In an embodiment, the WLAN 12, including the station 14 and AP 16, operates according to an IEEE 802.11 standard, such as IEEE 802.11a or IEEE 802.11n, for example. The WLAN 12 is coupled, via AP 16 and in a wired and/or wireless manner, to another network 18. In some embodiments, the network 18 is a public network, such as the Internet, for example. In other embodiments, the network 18 includes a corporate infrastructure network. In some embodiments and/or scenarios, the WLAN 12 includes one or more other stations (not shown in FIG. 1) in addition to the station 14.

Generally, various types of power management techniques may be used in systems such as system 10, in order to conserve battery life in portable stations such as station 14. Two prior art power management techniques will first be discussed with reference to FIGS. 2 and 3. Next, a new, enhanced power management technique will be described with reference to the example embodiment of FIG. 4.

Figure 2:
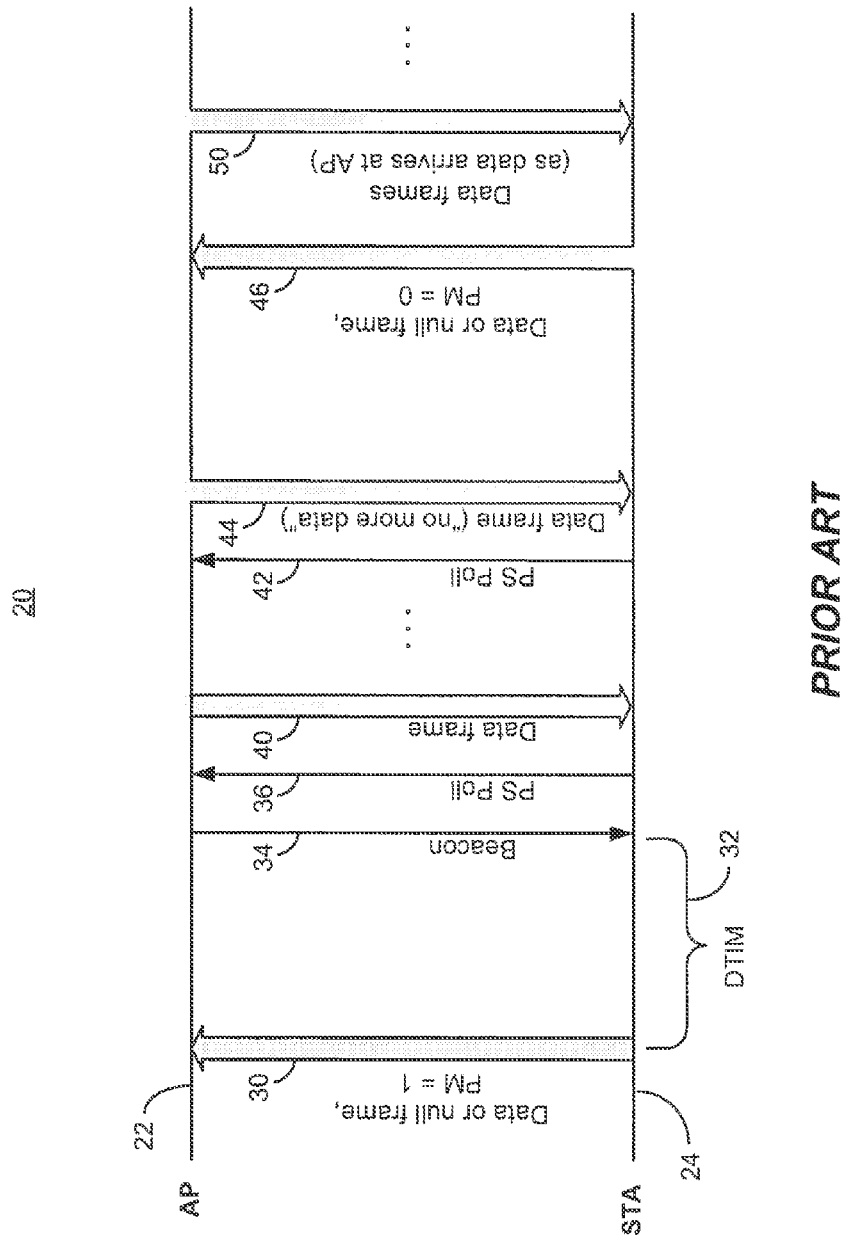
FIG. 2 is a sequence diagram of a power management technique provided by the IEEE 802.11 Standard.

FIG. 2 is a sequence diagram 20 of a prior art power management technique corresponding to the power save mode of the IEEE 802.11 Standard. The top horizontal line 22 in FIG. 2 represents an AP such as AP 16 of FIG. 1, and the bottom horizontal line 24 represents a station that is associated with the AP, such as station 14 of FIG. 1. In the sequence diagram 20, the station sends either a data or null frame 30 to the AP, with a "power management" (PM) bit set to one to inform the AP that the station is entering the power save mode and going to sleep. A Delivery Traffic Indication Message (DTIM) period 32 is equal to the number of beacon intervals that the station may sleep before the station must wake to listen for a beacon. After the DTIM period 32 elapses, the station wakes and listens for beacons from the AP. If the beacon 34 is detected by the station and indicates that data is available for the station, the station can send a "power save" (PS) poll message 36 to the AP. In response, the station receives a single data frame 40 from the AP. The station and AP may continue to exchange PS poll messages and data frames until, after a last PS poll message 42, the AP responds with a data frame 44 that includes a flag indicating that no more data is available for the station. When the station eventually desires to exit the power save mode (possibly after additional DTIM sleep periods), another data or null frame 46 is sent to the AP, but with the PM bit set equal to zero to inform the AP that the station is exiting the power save mode. Thereafter, the AP can send additional data frames 50 to the station as they arrive at the AP, without waiting for further PS poll messages.

The power management technique of FIG. 2 suffers from certain disadvantages. For example, the station must wake to listen for beacons every DTIM period (e.g., every 300 ms), which can consume a significant amount of power in bursty traffic scenarios where a station does not receive data for long periods of time.

Figure 3:
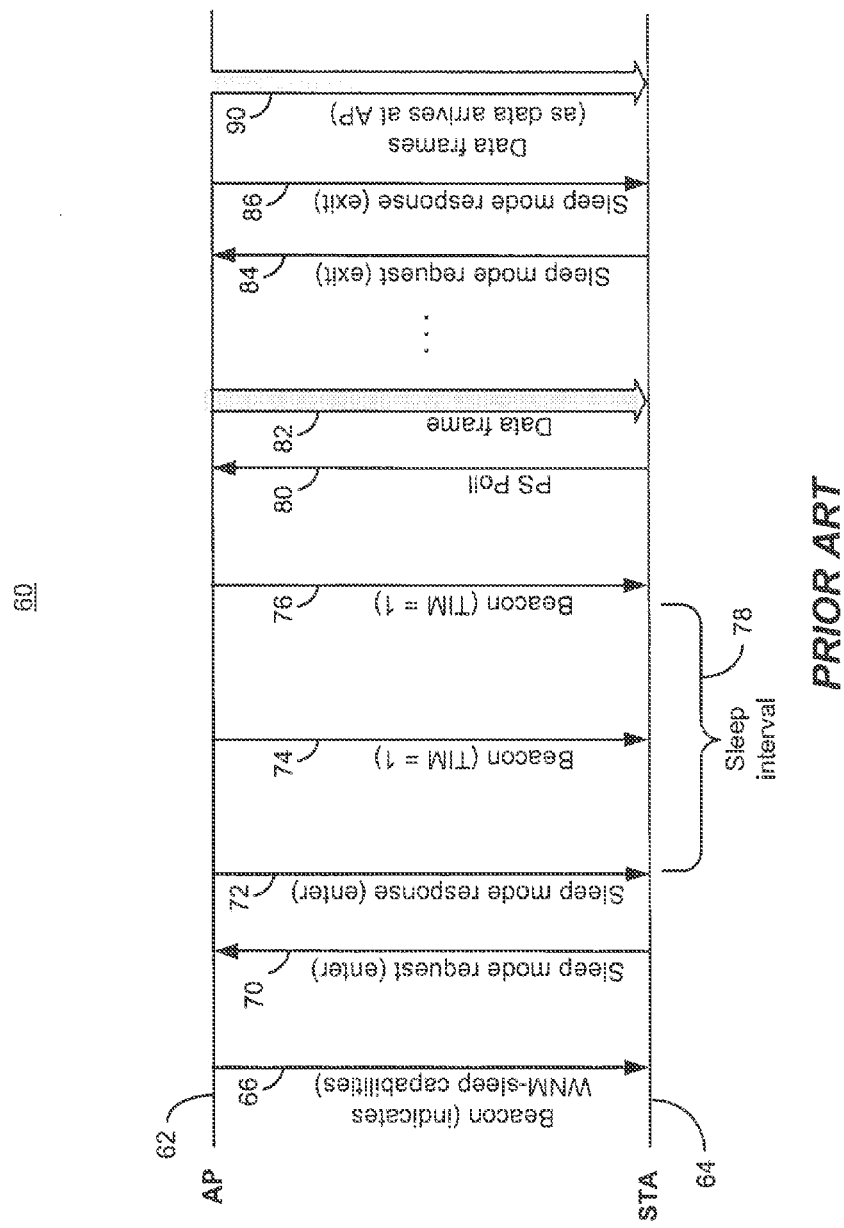
FIG. 3 is a sequence diagram of a power management technique provided by the IEEE 802.11v Standard.

FIG. 3 is a sequence diagram 60 of a prior art power management technique corresponding to the WNM-sleep mode of the IEEE 802.11v Standard, which allows a station to sleep for a substantially longer time period than the DTIM period 32 in the power management technique of FIG. 2. The top horizontal line 62 in FIG. 3 represents an AP such as AP 16 of FIG. 1, and the bottom horizontal line 64 represents a station, such as station 14 of FIG. 1. In the sequence diagram 60, the AP sends a beacon 66 that indicates the WNM-sleep capabilities of the AP, as defined by the IEEE 802.11v Standard. Thereafter, when the station desires to enter the WNM-sleep mode, and assuming that the station has already become associated with the AP, the station initiates a first handshake with the AP. Specifically, the station sends a sleep mode request 70 to the AP, and in return receives a sleep mode response 72 from the AP. The sleep mode request 70 includes a sleep mode information element indicating that the station wishes to enter the WNM-sleep mode, and indicating the sleep interval (i.e., the maximum amount of time before the station must wake to listen for beacons). The sleep interval may be on the order of seconds, and therefore may be substantially longer than the permissible DTIM periods used in the power management technique of FIG. 2. The request 70 also includes a traffic filtering service (TFS) request information element that specifies traffic classification ("TCLAS") information.

After the handshake that includes sleep mode request 70 and sleep mode response 72, the AP enables certain WNM services for the station. For example, the AP uses the TCLAS information to determine which data destined for the station (e.g., from an external network such as the Internet) should be buffered, and which data destined for the station should be discarded, while the station is sleeping. If the AP determines that data is available to be sent to the station, the AP sets the Traffic Indication Map (TIM) equal to one in each subsequent beacon until the station wakes up. In the example scenario of FIG. 3, the sleep interval 78 (as specified in the request 70) does not expire in time for the station to detect beacon 74, but does expire in time for the station to detect beacon 76, from which the station learns that data is available at the AP. To receive the data after the station wakes from the sleep interval 78, the station sends a PS poll message 80 to the AP, and in response receives a single data frame 82 that was buffered by the AP. This exchange of PS poll messages and single data frames may continue until the AP includes, within a final data frame not shown in FIG. 3, a flag indicating that no more data is available to be sent to the station.

If the station decides to exit the WNM-sleep mode, the station initiates a second handshake with the AP. Specifically, the station sends another sleep mode request 84 to the AP, and receives another sleep mode response 86 from the AP. The sleep mode request 84 includes a sleep mode information element indicating that the station wishes to exit the WNM-sleep mode. After receiving the request 84, the AP disables the WNM services for the station, and sends subsequent data frames 90 to the station as they arrive at the AP (e.g., from the Internet or another station).

The IEEE 802.11v power management technique of FIG. 3 allows a longer sleep period than the DTIM period 32 of the IEEE 802.11 power management technique shown in FIG. 2, but likewise suffers from certain disadvantages. For example, the current IEEE 802.11v Standard does not provide a mechanism for efficiently suspending and reentering the sleep state of the station during the sleep interval 78. Rather, a station desiring to do temporarily wake during the sleep interval must perform a first handshake (similar to request 84 and response 86) to exit the WNM-sleep mode, and a second handshake (similar to request 70 and response 72) to reenter the WNM-sleep mode, which can lead to a substantial amount of overhead in bursty usage scenarios. Additional problems may arise if a device is to simultaneously support both the IEEE 802.11 power save mode of FIG. 2 and the IEEE 802.11v WNM-sleep mode of FIG. 3. For example, the current IEEE 802.11v Standard does not specify whether a station may send to the AP, during the sleep interval of the WNM-sleep mode specified by IEEE 802.11v, a message with the "power management" (PM) bit set to zero, nor what effect such a message would have.

Figure 4:
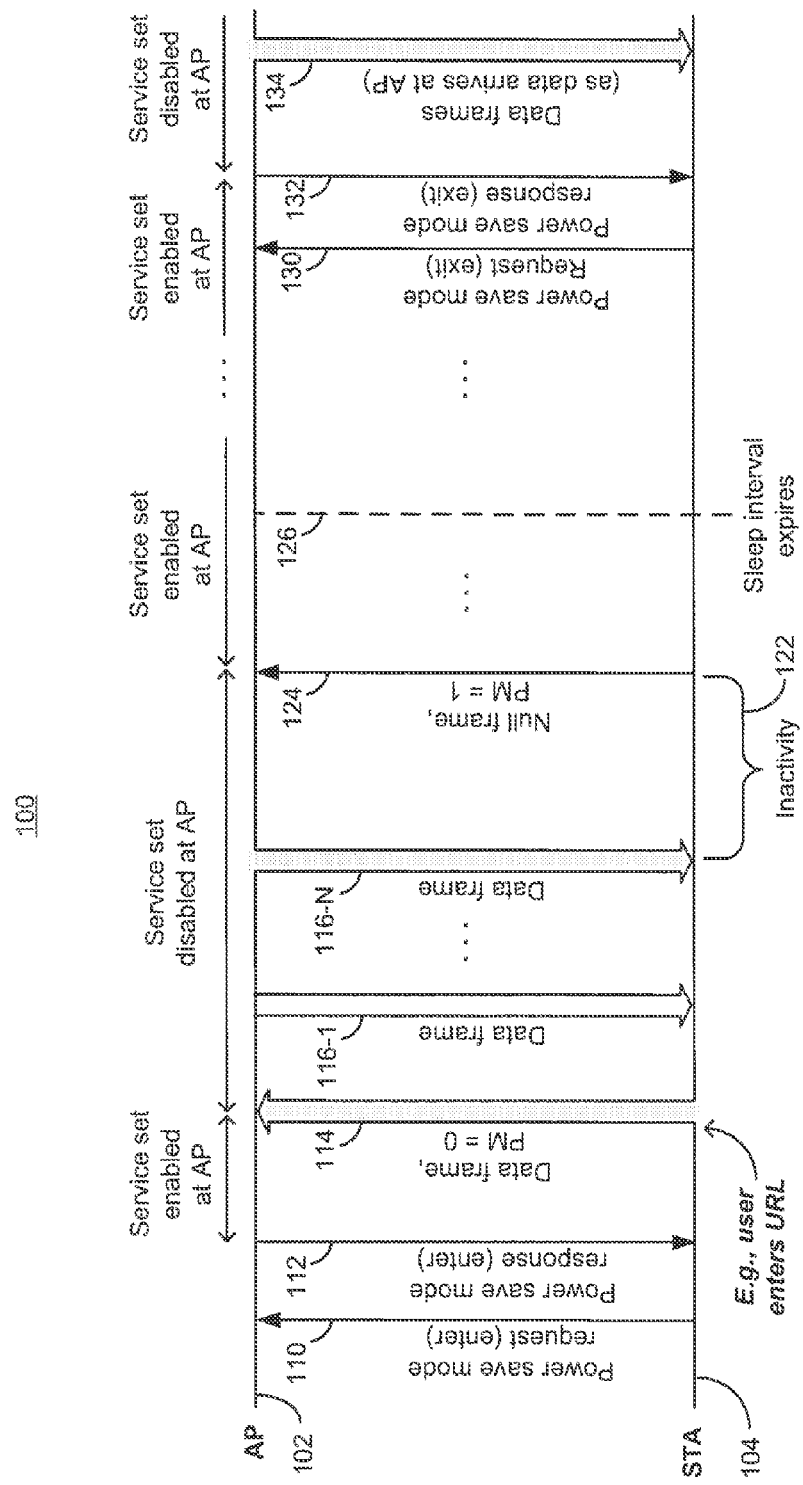
FIG. 4 is a sequence diagram of an example power management technique, according to an embodiment.

FIG. 4 is a sequence diagram 100 of an example power management technique addressing these issues, according to an embodiment. The top horizontal line 102 in FIG. 4 represents an AP (e.g., AP 16 of FIG. 1), and the bottom horizontal line 104 represents a station that is associated with the AP (e.g., station 14 of FIG. 1). In the example embodiment shown in sequence diagram 100, when the station desires to enter a power save mode (e.g., an enhanced WNM-sleep mode), the station initiates a first handshake with the AP. Specifically, the station sends a power save mode request 110 to the AP, and receives a power save mode response 112 from the AP. In an embodiment, the power save mode request 110 includes an information element indicating that the station wishes to enter the power save mode, and indicating the sleep interval (e.g., the maximum duration that the station 14 may sleep without waking to listen for a beacon, in an embodiment). In various embodiments, the sleep interval is a fixed duration, or has a duration selectable by the station 14. In some embodiments and/or scenarios, the sleep interval is on the order of seconds, and substantially longer than permissible DTIM periods used in the IEEE 802.11 power management technique of FIG. 2.

In one embodiment, the power save mode request 110 also includes a traffic filtering service (TFS) request information element that specifies traffic classification (e.g., TCLAS) information. In particular, in an embodiment, the power save mode request 110 specifies traffic parameters that the AP can use to determine which traffic/data destined for the station (e.g., from the Internet or another station) should be buffered, and which traffic/data destined for the station should be discarded. In various embodiments, for example, the traffic parameters include one or more of a source media access control (MAC) address, a destination MAC address, and a quality of service (QoS) classification.

In various embodiments, the power save mode response 112 includes one or more information elements confirming that the station is entering the power save mode, and/or confirming the traffic parameters included in the power save mode request 110. In an embodiment, the station does not enter the power save mode unless the station receives the power save mode response 112, to ensure that the AP has not rejected the request to enter the power save mode.

The station enters the power save mode by switching to a sleep state in which the station consumes less power and thus prolongs battery life. In one embodiment, the station conserves power in the sleep state by powering down various portions of circuitry within the station, and/or providing a lower bias current to various portions of circuitry within the station. In some embodiments, the station cannot receive, and/or cannot transmit, any signals while in the sleep state. In other embodiments, the station can only receive, and/or can only transmit, certain types of signals (e.g., control signals) while in the sleep state.

In response to receiving the power save mode request 110, the AP enables a set of one or more services for the station. In an embodiment, the set of services includes buffering of data, received by the AP, that is intended for the station. For example, in various embodiments and/or scenarios, the set of services includes buffering of data that is addressed to the station and received by the AP from the Internet, from a corporate infrastructure network, and/or from another station associated with the AP. In some embodiments where the power save mode request 110 includes traffic parameters, the set of services also includes a traffic filtering service that filters data intended for the station according to the traffic parameters. In one embodiment, for example, the AP only buffers data if the data is included in traffic satisfying the traffic parameters (e.g., source address, destination address, etc.), and discards data if the data is included in traffic that does not satisfy the traffic parameters.

In an embodiment, the beginning of the sleep interval corresponds to the handshake that includes the power save mode request 110 and power save mode response 112. In one embodiment, for example, the station measures the sleep interval from the time the station receives the power save mode response 112. If the station decides to wake during the sleep interval, the station sends a data frame 114 to the AP with a "power management" (PM) bit set equal to zero to indicate to the AP that the station is awake, in an embodiment. For example, in one embodiment and scenario, if a station determines that a user of the station has entered a URL via a web browser at the station, the station wakes and sends the data frame 114, with the payload data of data frame 114 including data that represents the URL. In other embodiments and/or scenarios, the data frame 114 is not a data frame, but instead a null frame with the PM bit set equal to zero. Moreover, in some embodiments, the data (or null) frame 114 provides a different indicator, other than a PM bit, to indicate to the AP that the station is awake.

After receiving the data frame 114 with the indicator that the station is awake, the AP disables the set of services (e.g., buffering and/or filtering) that the AP previously provided for the station, and sends N data frames 116-1 through 116-N to the station, where N is an integer greater than zero. In alternative embodiments and/or scenarios, the AP only disables certain services in response to receiving the data frame 114, while continuing to provide one or more other services. In one embodiment, for example, the AP continues to filter data destined for the station, such that data frames 116-1 through 116-N do not include any data that fails to satisfy the traffic parameters even if the AP had received the data after the other services were disabled.

In a scenario where the AP had buffered data intended for the station (e.g., data that satisfied traffic parameters specified in the power save mode request 110) prior to receiving the data frame 114, at least the first data frame 116-1 includes the buffered data, in an embodiment. In one embodiment and scenario, the data frame(s) 116-1 through 116-N include both data that the AP had buffered before receiving data frame 114, and subsequent data that the AP received (e.g., from the Internet) after receiving data frame 114.

In the example embodiment of FIG. 4, the station monitors for the expiration of an inactivity period 122 after receiving the last data frame 116-N. In one embodiment, the station resets an inactivity timer after receiving each of the one or more data frames 116-1 through 116-N. In one embodiment, the inactivity period 122 is a period during which the station does not receive any data from the AP.

In response to detecting an expiration of the inactivity period 122, the station sends a null frame 124 to the AP, in an embodiment. The null frame 124 sets the PM bit value equal to one to indicate to the AP that the station is reentering the sleep state, in an embodiment. In other embodiments and/or scenarios, the null frame 124 can instead be a data frame that includes a data payload in addition to the PM bit. After receiving the null (or data) frame 124, the AP once again enables the set of services for the station (e.g., buffering and/or filtering).

The station wakes (e.g., to listen for beacons from the AP) when the sleep interval expires at time 126. In some embodiments, the station measures the sleep interval from a starting point that corresponds to the initial handshake (as described above), and does not restart/reset the measurement regardless of whether the station interrupts the sleep interval by sending a frame with the PM bit set to zero (e.g., data frame 114). In an alternative embodiment, the station first measures the sleep interval relative to the initial handshake, but restarts/resets the measurement (e.g., resets a sleep interval timer) whenever the station goes back into the sleep state during the sleep interval (e.g., after sending the null frame 124). In one embodiment, for example, the station starts a sleep interval timer in response to receiving the power save mode response 112, and resets the sleep interval timer after sending the null frame 124.

According to different embodiments, the station and AP can behave in different ways once the sleep interval expires at time 126. In one embodiment, for example, a station that receives from the AP a beacon (not shown in FIG. 4) indicating that data is available for the station can send one or more PS poll messages to the AP, and receive a respective data frame from the AP in response to each PS poll message. In one such embodiment, the station goes back to sleep and restarts the sleep interval if the AP responds to a PS poll message with a data frame indicating that no further data is currently available to send to the station. In other example embodiments, the station restarts the sleep interval under other suitable conditions.

While sequence diagram 100 includes a period during which the sleep interval is interrupted (i.e., between data frame 114 and null frame 124), in other scenarios the station does not desire to wake during the sleep interval, and the set of services is enabled from the time of the handshake (request 110 and response 112) until time 126 when the sleep interval expires. In still other scenarios, in an embodiment, the station exits and reenters the sleep state more than once during the sleep interval that expires at time 126, by sending multiple data frames (similar to data frame 114) and respective null frames (similar to null frame 124) at different times throughout the duration of the sleep interval. Moreover, while sequence diagram 100 only shows a single sleep interval, other scenarios can include two or more sleep intervals, with each sleep interval being either continuous or interrupted depending on whether the station sends an indicator (e.g., as in data frame 114) during the respective sleep interval, in an embodiment.

When the station ultimately decides to exit the power save mode, an exit handshake is performed, in an embodiment. In one embodiment, the station initiates the handshake by sending a power save mode request 130 with an information element indicating that the station wishes to exit the power save mode, and the AP responds by sending a power save mode response 132 with an information element confirming that the power save mode is ending. In an embodiment, the AP can then send any additional data frames 130 to the station as data intended for the station arrives at the AP and is packaged into data frames, without waiting for any prompting, polling, or other indicators from the station.

In an embodiment, the power save mode of FIG. 4 is an enhanced version of the WNM-sleep mode currently defined by IEEE 802.11v. In this embodiment, the power save mode request 110 and power save mode response 112 are the same as the sleep mode request 70 and sleep mode response 72, respectively, in the IEEE 802.11v technique of FIG. 3. Moreover, in this embodiment, the power save mode of FIG. 4 is the same as the currently defined WNM-sleep mode with respect to some or all of the operation that follows the expiration of the sleep interval 78, from the exchange of PS poll messages and data frames through the exit handshake. Further, in this embodiment, the "power management" (PM) bit is defined in the same manner as the PM bit in the IEEE 802.11 power management technique of FIG. 2. Thus, this embodiment provides the interoperability between the IEEE 802.11 power save mode and the IEEE 802.11v WNM-sleep mode that is lacking under current standards.

Figure 5:
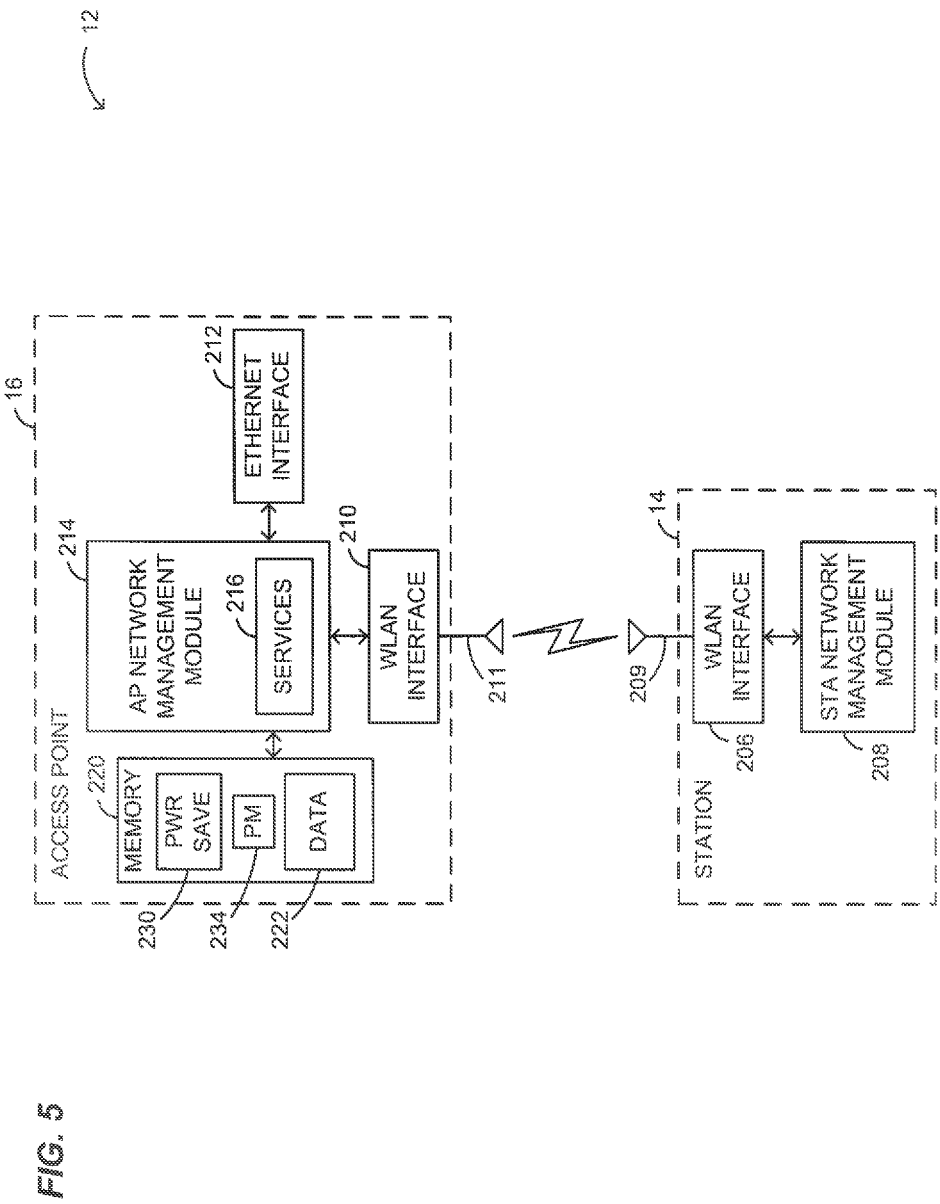
FIG. 5 is a block diagram providing a more detailed view of the example station and access point of FIG. 1, according to an embodiment in which the station and access point are configured to utilize the power management technique of FIG. 4.

FIG. 5 is a block diagram that provides a more detailed view of the station 14 and AP 16 in the WLAN 12 of FIG. 1, according to an embodiment in which the station 14 and AP 16 are configured to utilize the power management technique of FIG. 4. In the example WLAN 12 of FIG. 5, the station 14 includes a WLAN interface 206 coupled to a station network management module 208. The WLAN interface 206 is configured to support communications in WLAN 12, including communications to or from the AP 16. In an embodiment, the WLAN interface 206 includes a radio frequency transceiver (not shown in FIG. 5) that is configured to transmit and receive physical layer (PHY) data units (e.g., data frames or packets), a PHY processing unit configured to generate PHY data units for transmission and process (e.g., demodulate and decode) received PHY data units, and a MAC layer processing unit configured to generate MAC data units for transmission and process received MAC data units. The WLAN interface 206 includes, or is coupled to, one or more antennas 209 via which data can be wirelessly sent to, or received from, the AP 16.

The station network management module 208 performs various network management operations within the station 14, including at least power management operations. In one embodiment and scenario where the station 14 and AP 16 implement the power management technique of FIG. 4, the station network management module 208 generates the power save mode requests 110 and 130, processes the power save mode responses 112 and 132, detects when the station has data to send to the AP (and in response causes the PM bit to be set to zero in the data frame 114), detects the expiration of the inactivity period 122 (and in response causes the PM bit to be set to one in the null frame 124), and detects the expiration of the sleep interval at time 126. In an embodiment, the station network management module 208 also causes the station 14 to switch between sleep and awake states at the appropriate times based on these operations (e.g., as described above with reference to FIG. 4). In one embodiment, the station network management module 208 causes the station 14 to enter the sleep state by causing various circuits to be powered down within at least WLAN interface 206, and/or by causing a lower bias current to be provided to various circuits within at least WLAN interface 206.

The AP 16 includes a WLAN interface 210 and Ethernet interface 212, both of which are coupled to an AP network management module 214. The WLAN interface 210 is configured to support communications in WLAN 12, including communications to or from the station 14. In an embodiment, the WLAN interface 210 includes a radio frequency transceiver (not shown in FIG. 5) configured to transmit and receive PHY data units (e.g., data frames or packets), a PHY processing unit configured to generate PHY data units for transmission and process (e.g., demodulate and decode) received PHY data units, and a MAC layer processing unit configured to generate MAC data units for transmission and process received MAC data units. The WLAN interface 210 includes, or is coupled to, one or more antennas 211 via which data can be wirelessly sent to, or received from, the station 14. The Ethernet interface 212 is configured to support communications to and from a network external to the WLAN 12, such as the Internet or a corporate infrastructure network (e.g., network 18 of FIG. 1). In an alternative embodiment, the Ethernet interface 212 is instead a different type of network interface.

The AP network management module 214 performs various network management operations within the AP 16, including at least power management operations. In one embodiment and scenario where the station 14 and AP 16 implement the power management technique of FIG. 4, the AP network management module 214 processes the power save mode requests 110 and 130, generates the power save mode responses 112 and 132, and detects the value of the PM bit in the data frame 114 and null frame 124. In an embodiment, the AP network management module 214 also causes the AP 16 to provide the set of services to the station 14 at the appropriate times, and/or enables the AP 16 to send data to the station 14 at the appropriate times (e.g., as described above with reference to FIG. 4).

Further, in an embodiment, the AP network management module 214 determines the destination of data received via WLAN interface 210 (e.g., data from the station 14), and routes that data to the Ethernet interface 212 if the data has a destination address in the network coupled to the Ethernet interface 212. Similarly, in an embodiment, the AP network management module 214 determines the destination of data received via Ethernet interface 212 (e.g., data from the Internet), and routes that data to the WLAN interface 210 if the data has a destination address of a device within WLAN 12 (e.g., station 14).

In the example embodiment of FIG. 5, the AP network management module 214 also includes a services module 216 that manages the services that the AP 16 provides to the station 14 while the station 14 is in the sleep state. To properly manage the services, the services module 216 accesses a memory 220 that is also coupled to the AP network management module 214. In various embodiments, the memory 220 includes any volatile and/or nonvolatile computer readable memory, including but not limited to RAM and/or ROM memory.

In one embodiment, while the station 14 is asleep, the services module 216 buffers data that is destined for the station 14 (and received via the Ethernet interface 212 and/or via the WLAN interface 210) by causing the data to be stored as data 222 in the memory 220. In addition, in an embodiment, the services module 216 filters the data prior to buffering, such that the data 222 only includes data matching particular traffic parameters. In one embodiment, for example, the services module 216 filters the data according to a traffic classification included in a power save mode request, as described above with reference to the power save mode request 110 of the sequence diagram 100 in FIG. 4.

To determine whether the services module 216 should actively provide services to the station 14, the AP network management module 214 also causes other flags or indicators to be stored in the memory 220, in an embodiment. In various embodiments, for example, the AP network management module 214 sets the value of one or more "power save" bits 230 to indicate whether the station 14 is currently in the power save mode (e.g., based on whether the initial, "enter" handshake took place, and based on whether a subsequent "exit" handshake has since occurred), and/or one or more "PM" bits 234 to indicate whether the sleep interval is currently being interrupted (e.g., based on whether the station 14 most recently sent a frame with a PM bit set to zero or one, as described with reference to the example embodiment and scenario of FIG. 4). In one embodiment, for example, the AP network management module 214 instructs the services module 216 to enable the set of services when the bit(s) 230 indicate that the station 14 is in the power save mode and the bit(s) 234 indicate that the sleep interval is not currently interrupted.

Figure 6:
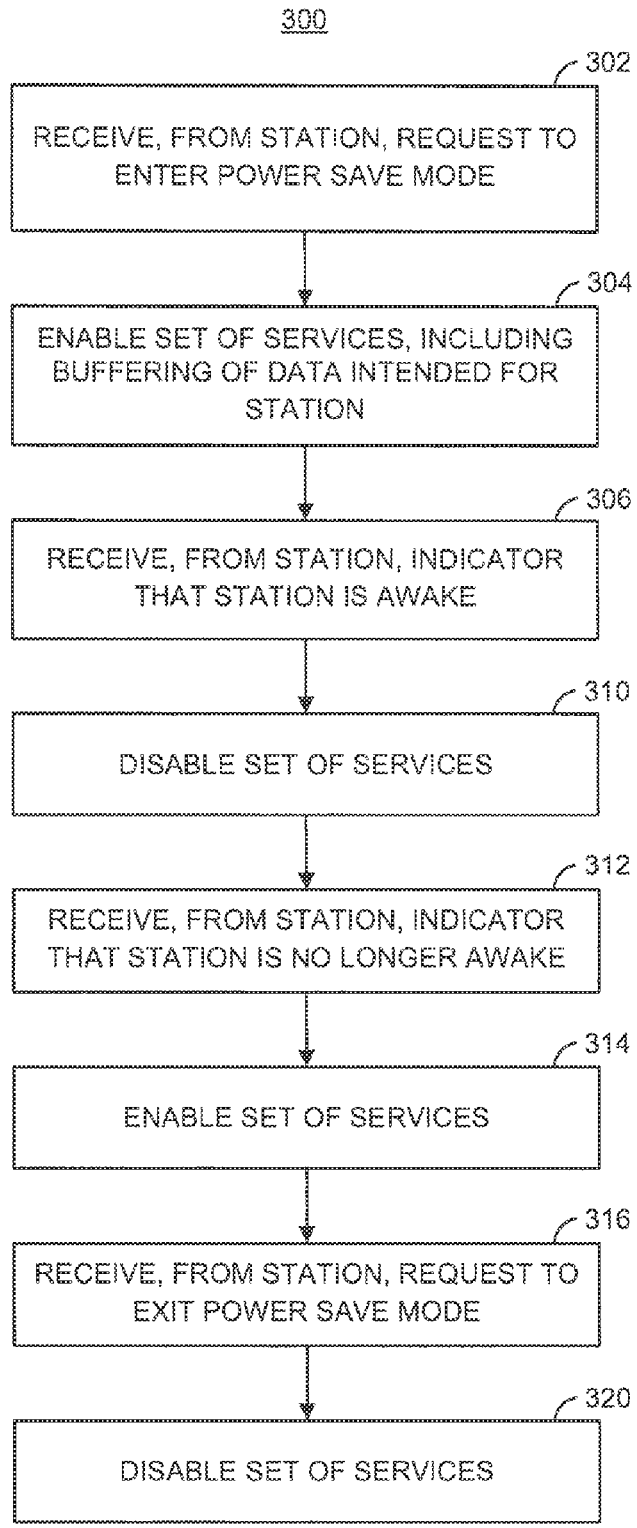
FIG. 6 is a flow diagram of an example method, implemented in a communication device such as an access point, for managing power consumption in a station, according to an embodiment.

FIG. 6 is a flow diagram of an example method 300, implemented in a communication device such as an access point, for managing power consumption in a station, according to an embodiment. In one embodiment, the method 300 is implemented by the AP 16 of FIGS. 1 and 5, in order to manage power consumption in the station 14 of FIGS. 1 and 5. In particular, in an embodiment, the method 300 is implemented by the AP network management module 214 (shown in FIG. 5) in the AP 16. For ease of explanation, the blocks of the method 300 will be described below with reference to an embodiment and scenario in which the method 300 is implemented by the AP 16 to help manage the power consumption at the station 14.

At block 302, the AP 16 receives a request to enter a power save mode from the station 14. In an embodiment, the request received at block 302 specifies a sleep interval. In one embodiment, the sleep interval indicates a maximum time that the station 14 can sleep without waking to listen for a beacon from the AP 16. In an embodiment, no group-key update procedure is required while the station 14 is in the power save mode. In one embodiment, the request received at block 302 is similar to the power save mode request 110 of FIG. 4.

In some embodiments, the method 300 also includes a block (not shown in FIG. 6), in response to receiving the request at block 302, in which the AP 16 sends a response to the station 14. The response includes an indicator confirming that the power save mode is being entered, and thus that the set of services is enabled, in an embodiment. In one embodiment, the response is similar to the power save mode response 112 of FIG. 4.

At block 304, in response to receiving the request at block 302, the AP 16 enables a set of one or more services. The set of services includes buffering of data that is intended for the station 14, such as data addressed to station 14 that the AP 16 receives from other stations, from the Internet, or from another device or network in communication with the AP 16. In an embodiment, the AP 16 buffers the data by storing the data in a memory such as memory 220 of FIG. 5, for example.

In some embodiments, the set of services also includes filtering of data intended for the station 14. In one such embodiment, the request received at block 302 specifies one or more traffic parameters, and the filtering of data is performed according to the traffic parameter(s). In one embodiment, for example, the traffic parameters include a source address, a destination address, and/or a quality of service (QoS) indicator (e.g., a maximum packet error rate, a maximum delay, a QoS classifier, etc.).

At a later time, at block 306, the AP 16 receives from the station 14 an indicator that the station 14 is awake. In an embodiment, the indicator is a value of a "power management" bit (e.g., PM=0) included in a data frame sent to the AP 16 by the station 14 such as data frame 114 of FIG. 4, for example. In other embodiments, the indicator is included in a null frame. In one embodiment and scenario where the indicator is included in a data frame, the same data frame also includes payload data representing a URL of a website that was entered by a user.

At block 310, in response to receiving the indicator at block 306, the AP 16 disables the set of services that was enabled at block 304. For example, the buffering of data intended for the station 14 is disabled, such that the data is instead sent to the station 14 as it arrives at AP 16 and is packaged into data frames (i.e., without waiting for PS poll or other messages from the station 14), in an embodiment. In one embodiment where the set of services enabled at block 304 includes traffic filtering, the traffic filtering service is also disabled at block 310.

At a later time, at block 312, the AP 16 receives from the station 14 an indicator that the station 14 is no longer awake (i.e., has entered a sleep state). In an embodiment, the indicator is a value of a "power management" bit (e.g., PM=1) included in a null frame, such as the null frame 124 of FIG. 4, for example. In other embodiments, the indicator is included in a data frame.

At block 314, in response to receiving the indicator at block 312, the AP 16 again enables the set of services that was disabled at block 310. For example, the AP 16 again enables buffering of data intended for the station 14 that the AP 16 receives from other stations, the Internet, or another device or network in communication with the AP 16. In one embodiment where the set of services enabled at block 304 includes traffic filtering, the traffic filtering service is also enabled once more at block 310.

At a later time, at block 316, the AP 16 receives, from the station 14, a request to exit the power save mode. In one embodiment, the request is similar to the power save mode request 130 of FIG. 4.

At block 320, in response to receiving the request at block 316, the AP 16 again disables the set of services that was enabled at block 314. For example, the buffering of data intended for the station 14 is again disabled, such that data is instead sent to the station 14 as it arrives at AP 16 and is packaged into data frames, in an embodiment. In some embodiments and/or scenarios, the AP 16 does not enable the set of services for the entire duration between block 314 and block 320. In some embodiments and scenarios, for example, additional sleep intervals occur in the time span between blocks 314 and 320, and the station 14 interrupts one or more of those sleep intervals (by sending the AP 16 indicators similar to the indicator received at block 306) prior to sending the request to exit the power save mode.

In an embodiment, the AP 16 receives the requests at blocks 302 and 316, and receives the indicators at blocks at 306 and 312, via a network interface, such as the WLAN interface 210 of FIG. 5, for example.

In some embodiments and/or scenarios, the method 300 includes other blocks not shown in FIG. 6. In one embodiment and scenario where the set of services include traffic filtering according to one or more traffic parameters specified in the request, for example, the method 300 includes additional blocks, after block 304 and before block 306, in which the AP 16 receives data intended for the station 14, determines that the received data does not match the traffic parameter(s), and in response to that determination discards the data. In an alternative scenario, after block 304 and before block 306, the AP 16 receives data intended for the station 14 (e.g., from another station, from the Internet, or from another network or device), determines that the received data does match the traffic parameter(s), and in response to that determination buffers the data. Further, in this latter scenario, the AP 16 sends the buffered data to the station 14 in an additional block after block 306 but before block 312.

Continuing with this example, in one embodiment, the method 300 includes additional blocks, after block 310 but before block 312, in which the AP 16 receives additional data intended for the station 14, and sends the additional data to the station 14 without waiting for another indicator from the station 14 (e.g., without waiting for a PS poll or other message from station 14). Further, in an embodiment, the method 300 includes still more blocks, after block 312, in which the AP 16 receives further data intended for the station 14, determines that the further data matches the traffic parameter(s), and in response to that determination stores that data in a buffer.

In another embodiment, the method 300 includes one or more additional blocks, after enabling the set of services at block 314 but before receiving the request to exit the power save mode at block 316, in which the AP 16 provides one or more data frames to the station 14 in response to one or more respective poll messages received from the station 14.

In some embodiments, the set of services enabled or disabled at each of blocks 304, 310, 314 and 320 does not include all services provided by the AP 16. In one embodiment, for example, the set of services enabled at block 304 includes buffering of data intended for the station 14, while filtering of data intended for the station 14 is an additional service. In one such embodiment, both the buffering service and the filtering service are enabled at block 304 and disabled at block 320, but only the buffering service is disabled at block 310 and re-enabled at block 312. In other words, in this embodiment, the set of services that includes data buffering can be interrupted in response to an indicator that the station 14 is awake, but the filtering of data remains enabled. In this embodiment, the AP 16 only sends data to the station 14 when the station 14 interrupts the sleep interval if that data matches the corresponding traffic parameters.

In an embodiment, the actions in some or all of the various blocks of the method 300 are performed by issuing commands and/or requests, or simply by receiving data. In one embodiment, for example, a network management module of AP 16, implementing the method 300, enables the set of services at blocks 304 and 314, and/or disables the set of services at blocks 310 and 320, by sending respective commands to another module within the AP 16.

Figure 7A:
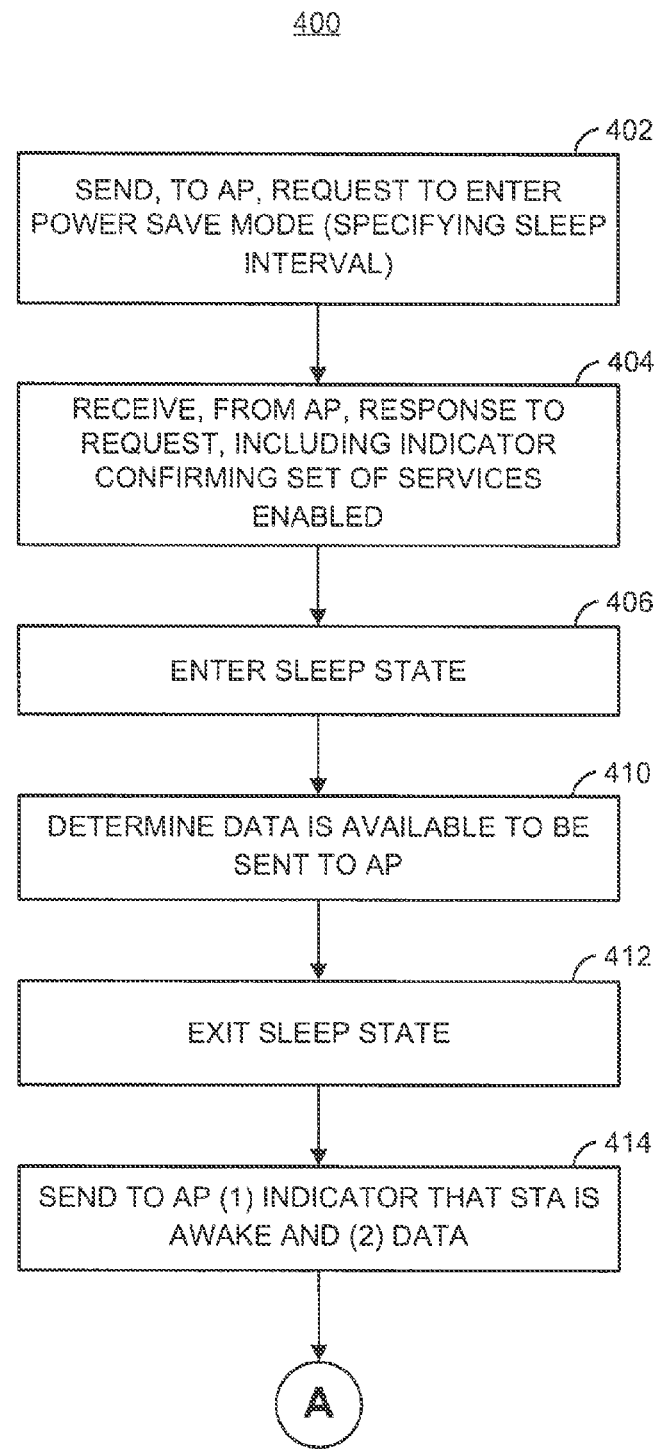
FIGS. 7A and 7B, collectively, are a flow diagram of an example method, implemented in a station, for managing power consumption in the station, according to an embodiment.
Figure 7B:
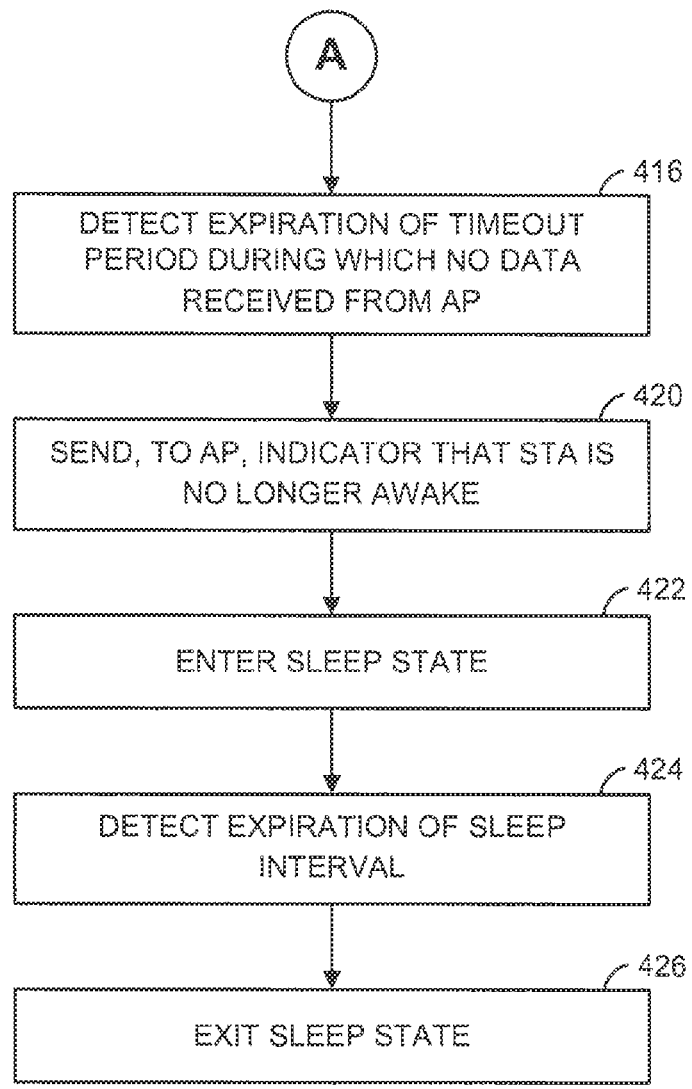

FIGS. 7A and 7B, collectively, are a flow diagram of an example method 400, implemented in a station, for managing power consumption in the station, according to an embodiment. In an embodiment, the method 400 of FIGS. 7A and 7B occurs at a station in conjunction with the method 300 of FIG. 6 occurring at an AP. In one embodiment, the method 400 is implemented by the station 14 of FIGS. 1 and 5, for the purpose of managing power consumption in the station 14. In particular, in an embodiment, the method 400 is implemented by the station network management module 208 (shown in FIG. 5) in the station 14. For ease of explanation, the blocks of the method 400 will be described below with reference to an embodiment and scenario in which the method 400 is implemented by the station 14, and with reference to the AP 16.

Referring first to FIG. 7A, at block 402, the station 14 sends a request to enter a power save mode to the AP 16. The request specifies a sleep interval. In one embodiment, the sleep interval indicates a maximum time that the station 14 can sleep without waking to listen for a beacon from the AP 16. In an embodiment, no group-key update procedure is required while the station 14 is in the power save mode. In one embodiment where the AP 16 provides a traffic filtering service, the request also specifies one or more traffic parameters. In an embodiment, the request is similar to the power save mode request 110 of FIG. 4.

At block 404, the station 14 receives, from the AP 16, a response to the request sent at block 402. The response includes an indicator confirming that the power save mode is being entered, and thus that set of services is enabled, in an embodiment. In some embodiments, the response received at block 404 is similar to the power save mode response 112 of FIG. 4. The set of services includes buffering of data intended for the station 14 (e.g., by storing the data at the AP 16 until a time that the station 14 exits the sleep state). The set of services is similar to that described above with reference to block 304 of the method 300, in an embodiment.

At block 406, the station 14 enters the sleep state, at least in part by decreasing power consumption at the station 14. In one embodiment, the station 14 conserves power in the sleep state by powering down various portions of circuitry within the station 14 (e.g., portions of the WLAN interface 206 in FIG. 5), and/or providing a lower bias current to various portions of circuitry within the station 14. In some embodiments, the station 14 cannot receive, and/or cannot transmit, any signals while in the sleep state. In other embodiments, the station 14 can only receive, and/or can only transmit, certain types of signals (e.g., control signals) while in the sleep state.

At a later time, at block 410, the station 14 determines that data is available to be sent to the AP 16. In one embodiment and scenario, for example, the station 14 determines that the data is available in response to the user entering a URL of a website.

At block 412, in response to the determination at block 410, the station 14 exits the sleep state that was entered at block 406, at least in part by increasing the power consumption at the station 14 relative to the power consumption during the sleep state entered at block 406. In one embodiment, the station 14 enters the same state at block 412 that the station 14 was in prior to entering the sleep state at block 406. In another embodiment, the station 14 enters an awake state at block 412 that is different (e.g., corresponds to a different level of power consumption) than the awake state the station 14 was in prior to entering the sleep state at block 406.

At block 414, and also in response to the determination at block 410, the station 14 sends an indicator that the station 14 is awake, as well as the data that was determined to be available at block 410, to the AP 16. In an embodiment, the indicator (e.g., one or more flag bits) and the data are included in a single data frame (e.g., in a header of the data frame and a payload portion of the data frame, respectively).

Referring next to FIG. 7B, at a later time, at block 416, the station 14 detects the expiration of a timeout period during which no data is received from the AP 16. In some embodiments, the timeout period is also a period during which no data is received from other wireless devices, such as other stations capable of peer-to-peer communications with the station 14, for example.

At block 420, in response to detecting the expiration of the timeout period at block 416, the station 14 sends to the AP 16 an indicator that the station 14 is no longer awake (i.e., is entering the sleep state).

At block 422, and also in response to detecting the expiration of the timeout period at block 416, the station 14 again enters the sleep state that was originally entered at block 406.

At a later time, at block 424, the station 14 detects the expiration of the sleep interval. In some embodiments, the sleep interval is measured only from a time associated with the reception of the request at block 402 (e.g., the time of sending the request or, if the AP 16 sends a response to the request, the time of receiving the response, etc.). In other embodiments, the sleep interval is reset after sending the indicator that the station 14 is no longer awake at block 420. In still other embodiments, the sleep interval is measured, and/or reset, in any other suitable manner.

At block 426, in response to detecting the expiration of the sleep interval at block 424, the station 14 exits the sleep state. In one embodiment, the station 14 exits the sleep state by returning to the same, or substantially the same, mode of operation (e.g., the same, or substantially the same, level of power consumption) that the station 14 was in prior to entering the sleep state at block 406.

In an embodiment, the station 14 sends the request at block 402, receives the response at block 404, and sends the indicator at blocks 414 and 420 via a network interface, such as the WLAN interface 206 of FIG. 5, for example.

In some embodiments and/or scenarios, the method 400 includes other blocks not shown in FIGS. 7A and 7B. In one embodiment and scenario where the set of services provided by the AP 16 includes traffic filtering according to one or more traffic parameters specified in the request sent at block 402, for example, the method 400 includes an additional block, after block 414 and before block 416, in which the station 14 receives data from the AP 16 in response to the indicator sent at block 414. In one such embodiment and scenario, the received data is data that the AP 16 (1) received from a different network or device, (2) determined to be a match with the traffic parameter(s), and (3) stored in a buffer, all before the station 14 sent the indicator at block 414.

In another embodiment, the method 400 includes a first additional block, after causing the station to exit the sleep state at block 426, in which the station 14 receives from the AP 16 a beacon signal indicating that data is available to be sent to the station 14, followed by a second additional block in which, in response to receiving the beacon signal indicating that data is available to be sent to the station, the station 14 sends a poll message to the AP 16. In some embodiments, these blocks are followed by a third additional block in which the station 14 receives at least one data frame from the AP 16 in response to the poll message.

In an embodiment, the actions in some or all of the various blocks of the method 400 are performed by issuing commands and/or requests, or simply by receiving data. In one embodiment, for example, a network management module of station 14, implementing the method 400, enters the sleep state at blocks 406 and 422, and/or suspends or exits the sleep state at block 412 or 426, by sending respective commands to another module within the station 14. In another example embodiment, a network management module of station 14, implementing the method 400, sends indicators to the AP 16 (e.g., within null or data frames) at blocks 414 and 420 by sending a WLAN interface, or other unit within the station 14, a command to transmit the indicators to the AP 16. In still another example embodiment, a network management module of station 14, implementing the method 400, detects the expiration of the sleep interval at block 424 by receiving an indicator from a timer circuit disposed elsewhere in the station 14.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method in a communication device, the method comprising:
    receiving from a station a request to enter a power save mode wherein the request to enter the power save mode includes one or more traffic parameters for filtering data intended for the station;
    in response to receiving the request to enter the power save mode, enabling a set of services, wherein the set of services includes (i) buffering of data intended for the station and (ii) filtering of data intended for the station, according to the one or more traffic parameters, to determine which data intended for the station should be buffered and which data destined for the station should be discarded;
    after enabling the set of services, receiving from the station an indicator that the station is awake;
    in response to receiving the indicator that the station is awake, disabling the set of services;
    after disabling the set of services, receiving from the station a communication frame having an indicator that the station is no longer awake, wherein the communication frame does not include the one or more traffic parameters for filtering data intended for the station;
    in response to receiving the indicator that the station is no longer awake, again enabling the set of services;
    after again enabling the set of services, receiving from the station a request to exit the power save mode; and
    in response to receiving the request to exit the power save mode, disabling the set of services.

2. The method according to claim 1, further comprising:
    also in response to receiving the request to enter the power save mode, sending a response to the station, wherein the response to the station includes an indicator confirming that the set of services is enabled.

3. The method according to claim 1, further comprising:
    after again enabling the set of services but before receiving the request to exit the power save mode, providing one or more data frames to the station in response to one or more respective poll messages from the station.

4. The method according to claim 1, wherein the one or more traffic parameters include at least one of (i) a source address, (ii) a destination address, and (iii) a quality of service indicator.

5. The method according to claim 1, further comprising:
    after enabling the set of services but before receiving the indicator that the station is awake
    receiving first data intended for the station,
    determining that the first data matches the one or more traffic parameters, and
    in response to determining that the first data matches the one or more traffic parameters, buffering the first data; and
    after receiving the indicator that the station is awake, sending the buffered first data to the station.

6. The method according to claim 5, further comprising, after disabling the set of services but before receiving the indicator that the station is no longer awake:
    receiving second data intended for the station; and
    sending the second data to the station without waiting for another indicator from the station.

7. The method according to claim 6, further comprising, after receiving the indicator that the station is no longer awake:
    receiving third data intended for the station;
    determining that the third data matches the one or more traffic parameters; and
    in response to determining that the third data matches the one or more traffic parameters, buffering the third data.

8. The method according to claim 1, wherein receiving an indicator that the station is awake includes receiving the indicator that the station is awake in a single data frame that also includes payload data.

9. A communication device comprising:
    a network interface configured to communicate with a station via a wireless communication channel;
    a memory configured to store data; and
    a network management module configured to
    in response to the network interface receiving, from the station via the wireless communication channel, a request to enter a power save mode, wherein the request to enter the power save mode includes one or more traffic parameters for filtering data intended for the station, enable a set of services, wherein the set of services includes (i) buffering, in the memory, of data intended for the station, and (ii) filtering of data intended for the station, according to the one or more traffic parameters, to determine which data intended for the station should be buffered and which data destined for the station should be discarded,
    in response to the network interface receiving, (i) from the station via the wireless communication channel and (ii) after enabling the set of services, an indicator that the station is awake, disable the set of services, including the buffering of data,
    in response to the network interface receiving, (i) from the station via the wireless communication channel and (ii) after disabling the set of services, a communication frame having an indicator that the station is no longer awake, wherein the communication frame does not include one or more traffic parameters for filtering data intended for the station, again enable the set of services,
    wherein subsequent to the network management module again enabling the set of services, in response to the network interface receiving, from the station via the wireless communication channel, a request to exit the power save mode, the network management module is configured to disable the set of services.

10. The communication device according to claim 9, wherein the network management module is further configured to:

also in response to the network interface receiving, from the station via the wireless communication channel, the request to enter the power save mode, send a response to the station via the network interface, wherein the response to the station includes an indicator confirming that the set of services is enabled.

11. The communication device according to claim 9, wherein the one or more traffic parameters include at least one of (i) a source address, (ii) a destination address, and (iii) a quality of service indicator.

12. A method in a station, wherein the method comprises:
sending to an access point a request to enter a power save mode, wherein the request to enter the power save mode specifies (i) a sleep interval, (ii) a request for the access point to filter data intended for the station, and (iii) one or more traffic parameters according to which data intended for the station is to be filtered by the access point;
receiving from the access point a response to the request, wherein
the response to the request includes an indicator confirming that a set of services is enabled, and
the set of services includes (i) buffering of data intended for the station and (ii) filtering of data intended for the station, according to the one or more traffic parameters, including determining which data intended for the station should be buffered by the access point and which data destined for the station should be discarded by the access point;
causing the station to enter a sleep state, wherein causing the station to enter the sleep state includes decreasing power consumption at the station;
after causing the station to enter the sleep state, determining that first data is available to be sent to the access point;
in response to determining that the first data is available to be sent to the access point,
causing the station to exit the sleep state, wherein causing the station to exit the sleep state includes increasing power consumption at the station,
sending to the access point (i) an indicator that the station is awake and (ii) the first data;
after causing the station to exit the sleep state, detecting an expiration of a timeout period during which no data is received from the access point;
in response to detecting the expiration of the timeout period,
sending to the access point a communication frame having an indicator that the station is no longer awake, wherein the communication frame does not include the one or more traffic parameters for filtering data intended for the station, and wherein the indicator that the station is no longer awake is configured to cause the access point to again enable the set of services, including the filtering of data intended for the station according to the one or more traffic parameters, and
causing the station to again enter the sleep state;
after causing the station to again enter the sleep state, detecting an expiration of the sleep interval; and
in response to detecting the expiration of the sleep interval, causing the station to again exit the sleep state.

13. The method according to claim 12, further comprising:
in response to sending the indicator that the station is awake, receiving from the access point second data matching the one or more traffic parameters, wherein receiving the second data includes receiving data that was buffered, at the access point, prior to sending the indicator that the station is awake.

14. The method according to claim 12, wherein sending an indicator that the station is awake and the first data includes sending a single data frame that includes both the indicator that the station is awake and the first data.

15. The method according to claim 12, further comprising:
after causing the station to again exit the sleep state, receiving from the access point a beacon signal indicating that data is available to be sent to the station;
in response to receiving the beacon signal indicating that data is available to be sent to the station, sending a poll message to the access point; and
receiving at least one data frame from the access point in response to sending the poll message to the access point.

16. A communication device comprising:
a network interface configured to communicate with an access point via a wireless communication channel; and
a network management module configured to
send, to the access point via the network interface, a request to enter a power save mode, wherein the request to enter the power save mode specifies (i) a sleep interval, (ii) a request for the access point to filter data intended for the communication device, and (iii) one or more traffic parameters according to which data intended for the station is to be filtered by the access point,
receive, from the access point via the network interface, a response to the request, wherein
the response to the request includes an indicator confirming that a set of services is enabled, and
the set of services includes (i) buffering of data intended for the communication device and (ii) filtering of data intended for the communication device, according to the one or more traffic parameters, to determine which data intended for the communication device should be buffered and which data destined for the communication device should be discarded,
cause the communication device to enter a sleep state, wherein causing the communication device to enter the sleep state includes causing power consumption to decrease at the communication device,
after causing the communication device to enter the sleep state, determine that first data is available to be sent to the access point,
in response to determining that the first data is available to be sent to the access point,
cause the communication device to exit the sleep state, wherein causing the communication device to exit the sleep state includes causing power consumption to increase at the communication device, and
send, to the access point via the network interface, (i) an indicator that the communication device is awake and (ii) the first data,
after causing the communication device to exit the sleep state, detect an expiration of a timeout period during which no data is received from the access point,
in response to detecting the expiration of the timeout period,
send, to the access point via the network interface, a communication frame having an indicator that the communication device is no longer awake, wherein the communication frame does not include the one or more traffic parameters for filtering data intended for the communication device, and wherein the indicator that the station is no longer awake is configured to cause the access point to again enable the set of services, including the filtering of data intended for the station according to the one or more traffic parameters, and cause the communication device to again enter the sleep state, after causing the communication device to again enter the sleep state, detect an expiration of the sleep interval, and in response to detecting the expiration of the sleep interval, cause the communication device to again exit the sleep state;

wherein the network management module is implemented on one or more integrated circuits.

17. The method according to claim 1, wherein the disabling of the set of services does not include disabling the filtering of data.

18. The communication device according to claim 9, wherein the disabling of the set of services does not include disabling the filtering of data.

19. The method according to claim 12, wherein when the station is awake the filtering of data is not disabled.

20. The communication device according to claim 16, wherein when the communication device is awake the filtering of data is not disabled.

* * * * *